United States Patent
Rodrigues (10) Patent No.: US 12,517,391 B2
(45) Date of Patent: Jan. 6, 2026

(54) ACTIVE REFLECTIVE FILTERS AND TRANSPARENT DISPLAY PANELS WITH ACTIVE REFLECTIVE FILTERS

(71) Applicant: Toyota Motor Engineering & Manufacturing North America, Inc., Plano, TX (US)

(72) Inventor: Sean P. Rodrigues, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 266 days.

(21) Appl. No.: 17/742,892

(22) Filed: May 12, 2022

(65) Prior Publication Data

US 2023/0367152 A1 Nov. 16, 2023

(51) Int. Cl.
*G02F 1/1335* (2006.01)
*B60J 1/00* (2006.01)
(Continued)

(52) U.S. Cl.
CPC ........ *G02F 1/133502* (2013.01); *B60J 1/001* (2013.01); *B60K 35/22* (2024.01); *G02F 1/13306* (2013.01); *G02F 1/133342* (2021.01); *G02F 1/133615* (2013.01); *G02F 1/13439* (2013.01); *B60K 35/60* (2024.01); *B60K 2360/77* (2024.01); *B60R 25/23* (2013.01); *G02F 2203/01* (2013.01)

(58) Field of Classification Search
CPC ......... G02F 1/133502; G02F 1/133342; G02F 1/13306; G02F 1/133615; G02F 1/13439; G02F 2203/01; B60K 35/22; B60K 2360/77; B60K 35/60; B60J 1/001; B60R 25/23

See application file for complete search history.

(56) References Cited

U.S. PATENT DOCUMENTS 8,637,331 B2  1/2014  Shanks
2002/0186928 A1  12/2002  Curtis
(Continued)

FOREIGN PATENT DOCUMENTS

KR  2012036034 A  *  4/2012

OTHER PUBLICATIONS

Espacenet English machine translation of KR20120036034A (Year: 2012).*

(Continued)

*Primary Examiner* — Michael H Caley
*Assistant Examiner* — David Y Chung
(74) *Attorney, Agent, or Firm* — Christopher G. Darrow; Darrow Mustafa PC (57) ABSTRACT

An active reflective filter includes an electroactive optical layer with an electroactive polymer (EAP) layer and a plurality of elements disposed in the EAP layer. The plurality of elements disposed in the EAP layer form or provide a periodic lattice and a spectral window, and the EAP layer is configured to change shape such that the periodic lattice and the spectral window change when a voltage is applied across the EAP layer. The active reflective filter can be included in waveguides and displays such as one-sided transparent displays, dual-sided transparent displays, and augmented reality glasses, among others.

15 Claims, 9 Drawing Sheets

(51) Int. Cl.
*B60K 35/22* (2024.01)
*B60K 35/60* (2024.01)
*B60R 25/23* (2013.01)
*G02F 1/133* (2006.01)
*G02F 1/1333* (2006.01)
*G02F 1/13357* (2006.01)
*G02F 1/1343* (2006.01)

(56) References Cited

U.S. PATENT DOCUMENTS

| | | | | |
|---|---|---|---|---|
| 2008/0036953 A1* | 2/2008 | Otake | ............... | G02F 1/133555 349/114 |
| 2008/0291525 A1* | 11/2008 | Kim | ................ | G02B 26/0808 359/291 |
| 2013/0021669 A1 | 1/2013 | Xi et al. | | |
| 2016/0161637 A1* | 6/2016 | Yen | ........................ | G02B 1/002 359/885 |
| 2021/0389615 A1 | 12/2021 | Rodrigues | | |
| 2022/0404665 A1* | 12/2022 | Shi | ...................... | G02F 1/13394 |
| 2023/0280620 A1* | 9/2023 | Kim | .................. | G02F 1/133357 |

OTHER PUBLICATIONS

Matsui et al., "Reconfigurable THz and microwave metamaterials based on π-conjugated polymers," 2016 IEEE MTT-S International Microwave Workshop Series on Advanced Materials and Processes for RF and THz Applications, pp. 1-4.

Matsui et al., "Electroactive Tuning of Double-Layered Metamaterials Based on π-Conjugated Polymer Actuators," Advanced Optical Materials, vol. 4, issue 1, Oct. 2015, pp. 135-140.

Pitchappa et al., "Terahertz MEMS metadevices," 2021 J. Micromech. Microeng., vol. 31, No. 11, pp. 1-21.

Zhou et al., "Full color waveguide liquid crystal display," Optics Letters, vol. 42, No. 18, Sep. 15, 2017, pp. 3706-3709.

* cited by examiner

ACTIVE REFLECTIVE FILTERS AND TRANSPARENT DISPLAY PANELS WITH ACTIVE REFLECTIVE FILTERS

TECHNICAL FIELD

The present disclosure relates generally to electromagnetic radiation filters, and particularly to optical reflective filters.

BACKGROUND

Development of electronic displays is an ongoing field of research. For example, recently developed (i.e., within the last 15 years) transparent displays provide an image for an individual to see on one side of the display while being transparent such that the individual can also see through the display. Also, some transparent displays display an image that is transparent while other transparent displays display an image that is opaque with the remainder of the transparent display being transparent. And dual-sided transparent displays provide a different image for individuals on opposite sides of the display to see while being transparent in areas where an image is not shown such that both individuals can still see through the display in these "empty regions." However, such displays can exhibit undesirable optical effects such as light bleeding, i.e., an image from one side of the display is shown on the opposite side of the display. In fact, most single sided transparent displays bleed some amount of light to the unintended or reverse side of the display.

The present disclosure addresses issues related to light bleeding in transparent displays, and other issues related to transparent displays.

SUMMARY

This section provides a general summary of the disclosure and is not a comprehensive disclosure of its full scope or all of its features.

In one form of the present disclosure, an active reflective filter includes an electroactive optical (EAO) layer with an electroactive polymer (EAP) layer and a plurality of elements disposed in the EAP layer. The plurality of elements disposed in the EAP layer form or provide a periodic lattice and a spectral window, and the EAP layer is configured to change shape such that the periodic lattice and the spectral window change when a voltage is applied across the EAP layer.

In another form of the present disclosure, a waveguide includes a pair of transparent layers and a plurality of subpixels sandwiched between the pair of transparent layers. The plurality of subpixels includes an EAO layer with an EAP layer and a plurality of elements disposed in the EAP layer. The plurality of elements disposed in the EAP layer form or provide a periodic lattice and a spectral window, and the EAP layer is configured to change shape such that the periodic lattice and the spectral window change when a voltage is applied across the EAP layer. The plurality of subpixels also includes a liquid crystal unit disposed on the EAP layer and the liquid crystal unit includes a liquid crystal matrix and a transparent electrode.

In still another form of the present disclosure, a waveguide includes a pair of transparent layers and a plurality of subpixels sandwiched between the pair of transparent layers. The plurality of subpixels includes a first subset of subpixels facing a first direction normal to the pair of transparent layers and a second subset of subpixels facing a second direction opposite and parallel to the first direction. Also, the plurality of subpixels includes an EAO layer with an EAP layer and a plurality of elements disposed in the EAP layer. The plurality of elements disposed in the EAP layer forms or provides a periodic lattice and a spectral window for the EAO layer, and the EAP layer is configured to change shape such that the periodic lattice and the spectral window change when a voltage is applied across the EAP layer. The plurality of subpixels also includes a liquid crystal unit disposed on the EAP layer and the liquid crystal unit includes a liquid crystal matrix and a transparent electrode.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

DETAILED DESCRIPTION

The present disclosure provides an active reflective filter (ARF) that is adjustable with respect to a range of electromagnetic radiation (EMR) wavelengths reflected by the ARF. In some variations, the ARF includes an electroactive polymer (EAP) layer and a plurality of metamaterial elements disposed or embedded in the EAP layer such that the ARF has a periodic lattice. A voltage applied across the EAP layer results in the EAP layer changing its shape, which in turn results in the periodic lattice of the ARF changing or shifting such that a predefined range of EMR wavelengths reflected by the ARF changes. Stated differently, a band or color of light reflected by the ARF is controlled and changed by changing the voltage applied across the EAP layer of the ARF. In addition, the ARF is transparent to EMR outside of the predefined range of reflected wavelengths. Accordingly, the ARF is transparent to all colors except for the reflected range of EMR wavelengths and thus the ARF can be used to replace RGB filters, enhance brightness, and decrease light bleeding of a transparent display as discussed in greater detail below.

Figure 1:
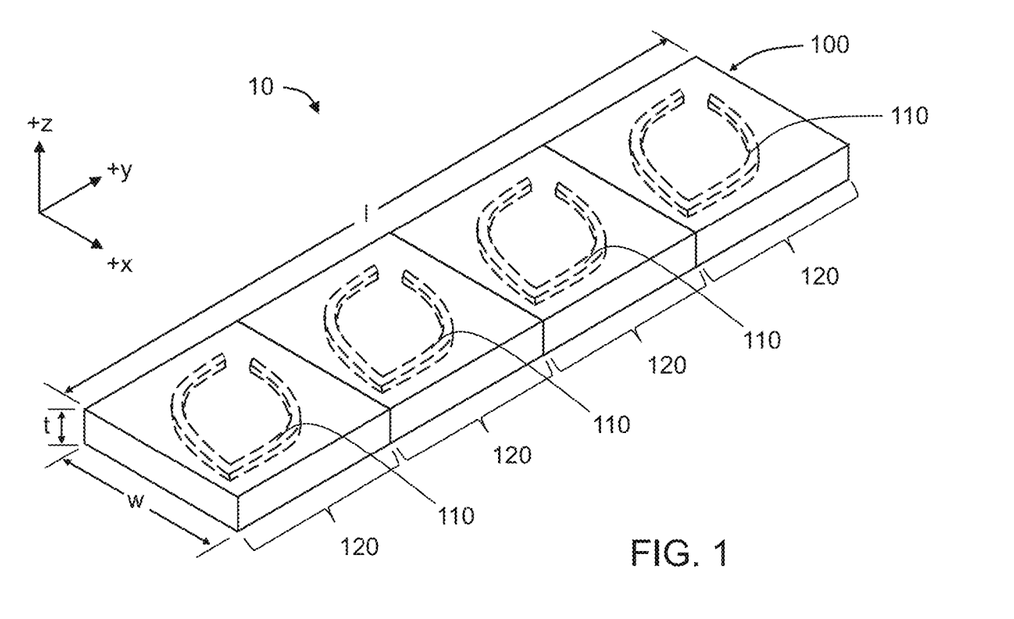
FIG. 1 shows an active reflective filter with a plurality of metamaterial elements disposed in an electroactive polymer layer according to the teachings of the present disclosure.

Referring to FIG. 1, one non-limiting example of an ARF according to the teachings of the present disclosure is generally shown at reference numeral 10. The ARF 10 includes an EAP layer 100 with a thickness 't', a width 'w', and a length 'l'. The thickness t of the EAP layer 100 is between about 0.5 micrometers (μm) and about 500 μm, the width w is between about 0.3 μm and about 5 μm, and the length is between about 0.3 μm and about 5 μm. Non-limiting examples of the EAP used to from the EAP layer 100, and other EAP layers disclosed herein, include dielectric EAPs, ferroelectric polymers, electrostrictive graft polymers, ionic EAPs, ionic polymer-metal composites, among others.

In some variations, the ARF 10 can be formed from a plurality of unit cells 120 (also referred to herein simply as "plurality of cells") with each unit cell 120 (also referred to herein simply as "cell") including a metamaterial element 110 (also referred to herein simply as "an element" of "elements"). In the alternative, the ARF 10 can be a single cell with the plurality of elements 110 disposed within the cell 120. That is, one or more of the cells 120 can be combined into a single cell. And while FIG. 1 shows a single row of cells 120 aligned along the y-direction in the figures, it should be understood that the ARF 10 can include two or more rows of cells 120 in the x-direction and/or in the z-direction as discussed in greater detail below. The plurality of elements 110 disposed in the EAP layer 100 forms or provides a periodic lattice for the ARF 10. However, and while the structure of the ARF 10 shown in FIG. 1 appears symmetric, it should be understood that the structure of the ARF 10 can be asymmetric. In addition, in some variations a sub-pixel of a display includes a plurality of ARFs 10.

Still referring to FIG. 1, a plurality of elements 110 are disposed within the EAP layer 100 such that the ARF 10 is a metamaterial. As used herein, the term "metamaterial" refers to an electromagnetic metamaterial with a repeating pattern having dimensions less than wavelengths of EMR propagated onto and influenced by (e.g., reflected) the ARF 10. In some variations the metamaterial includes photonic crystals and/or nanophotonic systems, and the metamaterial, i.e., the plurality of elements 110 disposed in the EAP layer 100, forms or provides a periodic lattice for the ARF 10. As used herein, the phrase "periodic lattice" refers to a symmetric array of elements disposed within the EAP layer 100.

Figure 2:
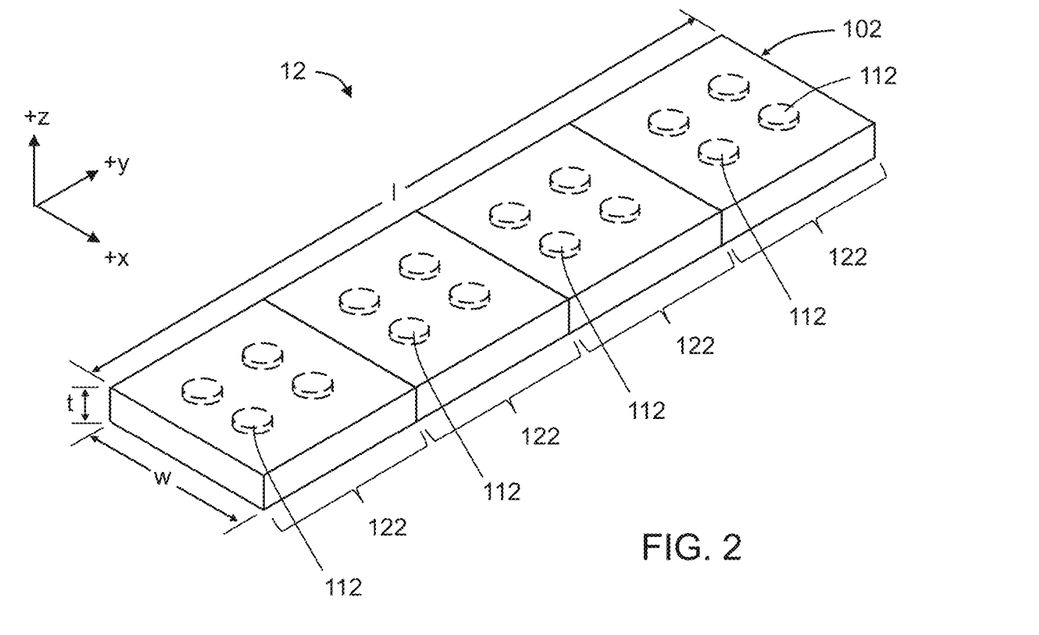
FIG. 2 shows another active reflective filter with a plurality of metamaterial elements disposed in an electroactive polymer layer according to the teachings of the present disclosure.

Referring to FIG. 2, another non-limiting example of an ARF according to the teachings of the present disclosure is generally shown at reference numeral 12. The ARF 12 includes an EAP layer 102 with a thickness 't', a width 'w', and a length 'l', and a plurality of elements 112 disposed within the EAP layer 102. And as shown in FIG. 2, the ARF 12 can be formed from a plurality of cells 122 with each cell 122 including a plurality of elements 112. In the alternative, the ARF 12 can be formed from a single cell 122 with the plurality of elements 112 disposed within the cell 122. That is, one or more of the cells 122 can be combined into a single cell 122. And while FIG. 2 shows a single row of cells 122 aligned along the y-direction in the figures, it should be understood that the ARF 12 can include two or more rows of cells 122 in the x-direction and/or the z-direction. The plurality of elements 112 disposed in the EAP layer 102 forms or provides a periodic lattice for the ARF 12. However, and while the structure of the cells 122 and/or the ARF 12 shown in FIG. 2 appear symmetric, it should be understood that the structure of the cells 122 and/or the ARF 12 can be asymmetric. In addition, in some variations a sub-pixel of a display includes a plurality of ARFs 12.

Figure 3:
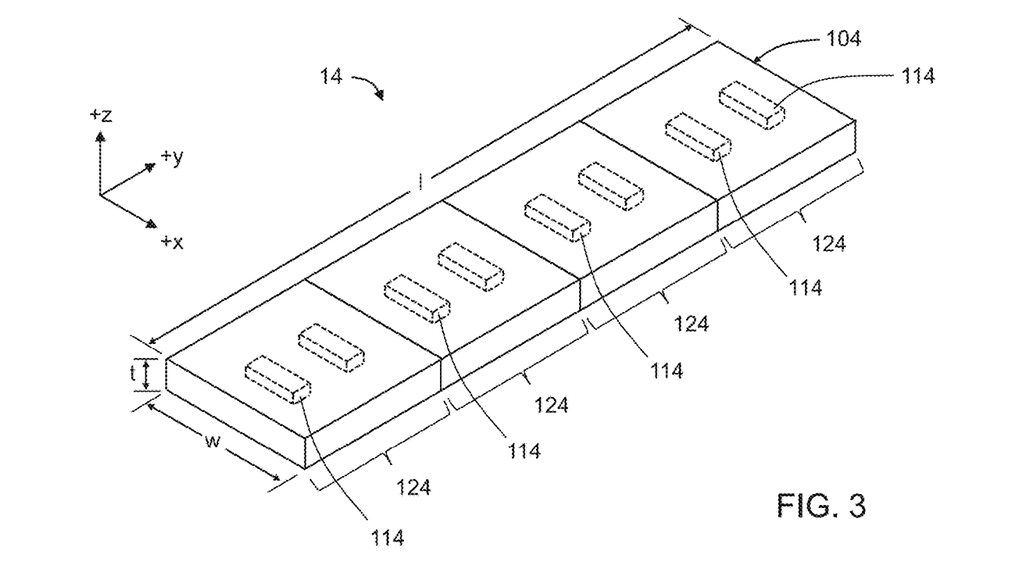
FIG. 3 shows still another active reflective filter with a plurality of metamaterial elements disposed in an electroactive polymer layer according to the teachings of the present disclosure.

Referring to FIG. 3, still another non-limiting example of an ARF according to the teachings of the present disclosure is generally shown at reference numeral 14. The ARF 14 includes an EAP layer 104 with a thickness 't', a width 'w', and a length 'l', and a plurality of elements 114 disposed within the EAP layer 104. And as shown in FIG. 3, the ARF 14 can be formed from a plurality of cells 124 with each cell 124 including a plurality of elements 114. In the alternative, the ARF 14 can be formed from a single cell 124 with the plurality of elements 114 disposed within the cell 124. That is, one or more of the cells 124 can be combined into a single cell 124. And while FIG. 3 shows a single row of cells 124 aligned along the y-direction in the figures, it should be understood that the ARF 14 can include two or more rows of cells 124 in the x-direction and/or the z-direction. The plurality of elements 114 disposed in the EAP layer 104 forms or provides a periodic lattice for the ARF 14. However, and while the structure of the cells 124 and/or the ARF 14 shown in FIG. 3 appear symmetric, it should be understood that the structure of the cells 124 and/or the ARF 14 can be asymmetric. In addition, in some variations a subpixel of a display includes a plurality of ARFs 14.

Figure 4A:
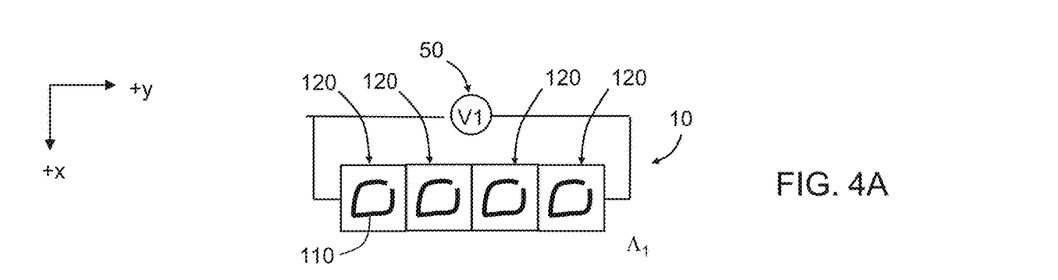
FIG. 4A shows the active reflective filter in FIG. 1 with a first voltage applied across the electroactive polymer layer in the y-direction such that the active reflective layer has a first periodic lattice.
Figure 4B:
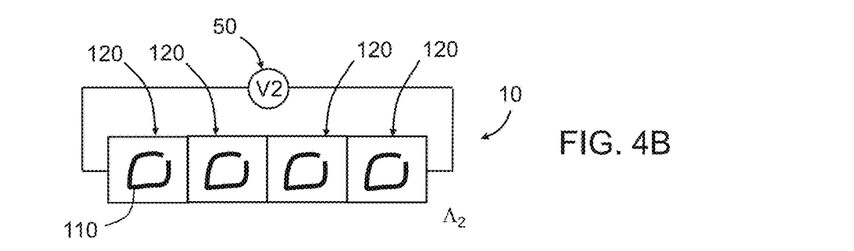
FIG. 4B shows the active reflective filter in FIG. 1 with a second voltage applied across the electroactive polymer layer in the y-direction such that the active reflective layer has a second periodic lattice.
Figure 4C:
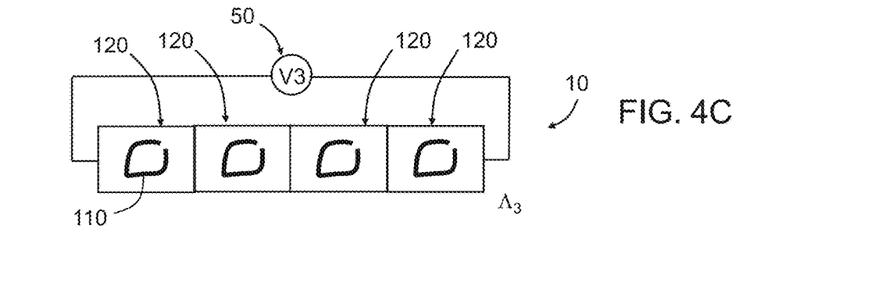
FIG. 4C shows the active reflective filter in FIG. 1 with a third voltage applied across the electroactive polymer layer in the y-direction such that the active reflective layer has a third periodic lattice.

Referring now to FIGS. 4A-4C, changing or shifting the periodic lattices of the ARFs 10, 12, and 14 is illustratively shown and discussed with reference to the ARF 10. Particularly, the ARF 10 with an electrical power source 50 in electrical communication with the EAP layer 100 is shown in FIGS. 4A-4C. Also, the electrical power source 50 is configured to apply a voltage across the length (y-direction) of the plurality of cells 120. In some variations (e.g., depending on the type of EAP from which the EAP layer 100 is formed), a first voltage V1 applied across the plurality of cells 120 is shown in FIG. 4A, a second voltage V2 greater than the first voltage V1 applied across the plurality of cells 120 is shown in FIG. 4B, and a third voltage V3 greater than the second voltage V2 applied across the plurality of cells 120 is shown in FIG. 4C. While in other variations, a first voltage V1 applied across the plurality of cells 120 is shown in FIG. 4A, a second voltage V2 less than the first voltage V1 applied across the plurality of cells 120 is shown in FIG. 4B, and a third voltage V3 less than the second voltage V2 applied across the plurality of cells 120 is shown in FIG. 4C. And as illustrated by comparing FIG. 4B to FIG. 4A and comparing FIG. 4C to FIG. 4B, the plurality of cells 120 (i.e., the EAP layer 100 of the plurality of cells 120) increases in length along the y-direction (i.e., stretches) such that the ARF 10 in FIG. 4A has a first periodic lattice $\Lambda_1$, the ARF 10 in FIG. 4B has a second periodic lattice $\Lambda_2$, and the ARF 10 in FIG. 4C has a third periodic lattice $\Lambda_3$. Accordingly, stretching of the EAP layer 100 and/or the elements 110 disposed within the EAP layer 100 in the 7-direction changes or shifts the periodic lattice of the ARF 10. Accordingly, it should be understood that a change in the period lattice of the ARF 10 (and other ARFs disclosed herein) can be provided by a change in distance between adjacent elements disposed within the EAP layer.

Figure 5:
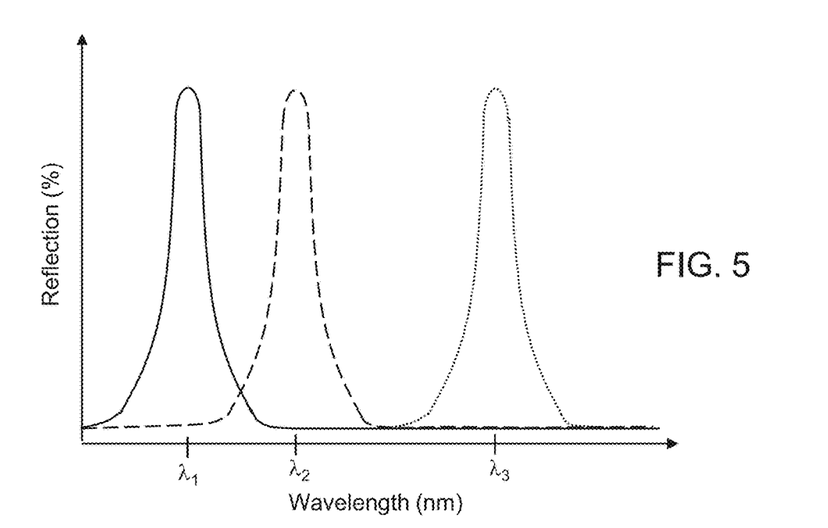
FIG. 5 shows reflected spectral window for the active reflective filter in FIGS. 4A-4C.

Referring to FIG. 5, a plot of EMR wavelengths reflected by the ARF 10 in FIGS. 4A-4C is shown. Particularly, the ARF 10 in FIG. 4A with the first periodic lattice $\Lambda_1$ reflects a narrow band of EMR centered about wavelength $\lambda_1$, the ARF 10 in FIG. 4B with the second periodic lattice $\Lambda_2$ reflects a narrow band of EMR centered about wavelength $\lambda_2$, and the ARF 10 in FIG. 4C with the third periodic lattice $\Lambda_3$ reflects a narrow band of EMR centered about wavelength $\lambda_3$. Accordingly, applying two or more different voltages to the EAP layer 100 changes the periodic lattice of the ARF 10 and thereby changes or shifts the range of wavelengths reflected by the ARF 10. And while FIGS. 4A-4C show stretching of the cells 120 of the ARF 10 in the y-direction, it should be understood that the cells 120 of the ARF 10 can be stretched in other directions.

Figure 8A:
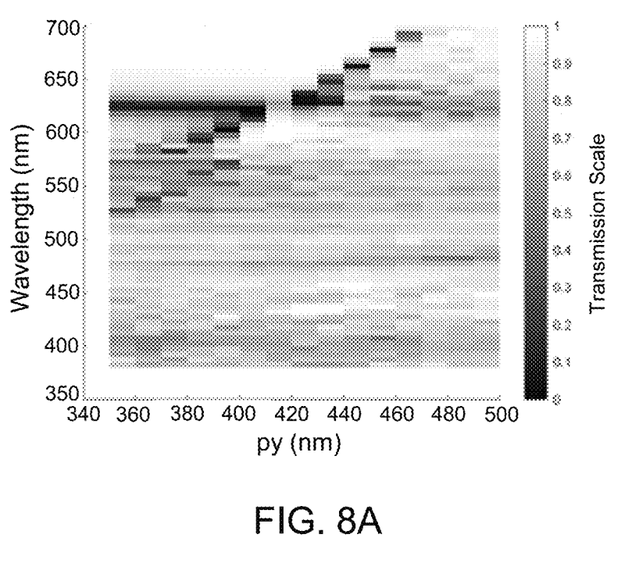
FIG. 8A shows a plot of wavelength transmission through an active reflective filter according to the teachings of the present disclosure as a function of a periodic lattice dimension in the y-direction (py) of the active reflective filter.

For example, and with reference to FIGS. 6A-6C, changing or shifting the periodic lattices of the ARFs 10, 12, and 14 in the y- and x-directions is illustratively shown and discussed with reference to the ARF 10. Particularly, the electrical power source 50 is in electrical communication with and configured to apply voltages across the length (y-direction) and an electrical power source 60 is in electrical communication with and configured to apply voltages across the width (x-direction) of the plurality of cells 120. In addition, applying first voltages V1, Va across the plurality of cells 120 in the y- and x-directions, respectively, is shown in FIG. 8A, applying second voltages V2, Vb greater or less than first voltages V1, Va across the plurality of cells 120 in the y- and x-directions, respectively, is shown in FIG. 6B, and applying third voltages V3, Vc greater or less than, respectively, second voltages V2, Vb across the plurality of cells 120 in the y- and x-directions is shown in FIG. 6C. And as illustrated by comparing FIG. 6B to FIG. 6A and comparing FIG. 6C to FIG. 6B, the plurality of cells 120 (i.e., the EAP layer 100 of the plurality of cells 120) increase in length along the y- and x-directions (i.e., stretch) such that the ARF 10 in FIG. 6A has a first periodic lattice $\Lambda_I$, the ARF 10 in FIG. 6B has a second periodic lattice $\Lambda_{II}$, and the ARF 10 in FIG. 6C has a third periodic lattice $\Lambda_{III}$. Accordingly, stretching of the EAP layer 100 and/or the elements 110 disposed within the EAP layer 100 in the y- and x-directions changes or shifts the periodic lattice of the ARF 10 and thereby changes or shifts the range of EMR wavelengths reflected by the ARF 10 as discussed above.

It should be understood that in some variations the EAP layer 100 for the ARF 10 described above with respect to FIGS. 6A-6C is formed from an EAP that is the same as the EAP used to form the EAP layer 100 for the ARF 10 described above with respect to FIGS. 4A-4C, while in other variations the EAP layer 100 for the ARF 10 described above with respect to FIGS. 6A-6C is formed from an EAP that is not the same as the EAP used to form the EAP layer 100 for the ARF 10 described above with respect to FIGS. 4A-4C.

Figure 6A:
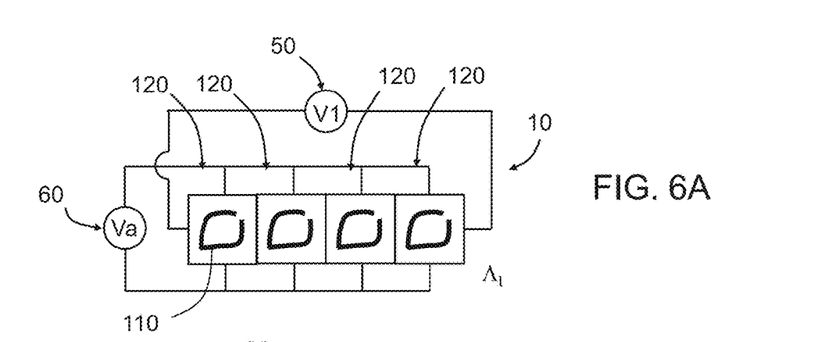
FIG. 6A shows the active reflective filter in FIG. 1 with a first voltage applied across the electroactive polymer layer in the y-direction and another first voltage applied across the electroactive polymer layer in the x-direction such that the active reflective layer has a first periodic lattice.
Figure 6B:
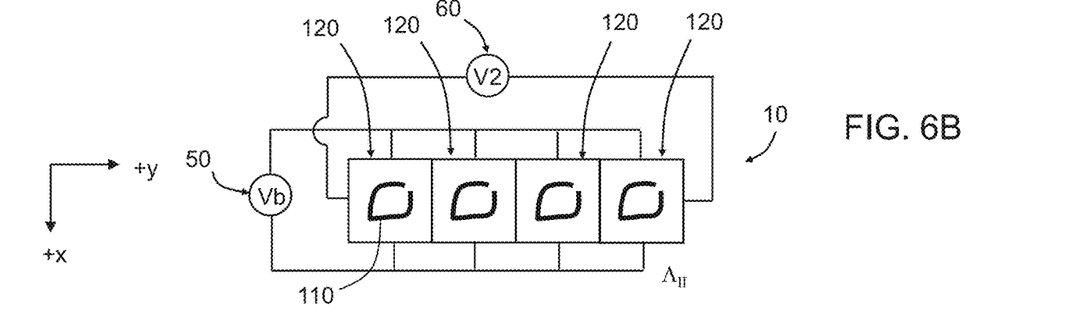
FIG. 6B shows the active reflective filter in FIG. 1 with a second voltage applied across the electroactive polymer layer in the y-direction and another second voltage applied across the electroactive polymer layer in the x-direction such that the active reflective layer has a second periodic lattice.
Figure 6C:
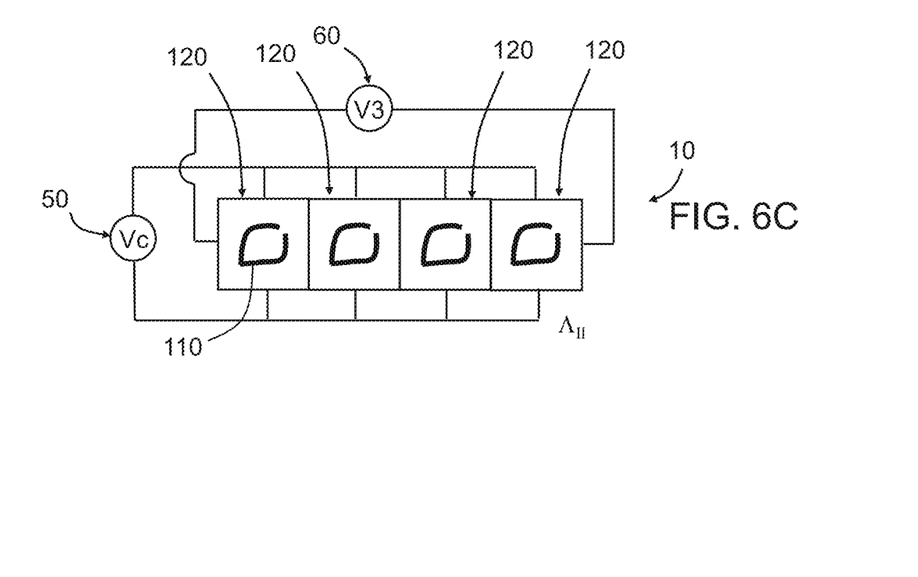
FIG. 6C shows the active reflective filter in FIG. 1 with a third voltage applied across the electroactive polymer layer in the y-direction and another third voltage applied across the electroactive polymer layer in the x-direction such that the active reflective layer has a third periodic lattice.
Figure 7:
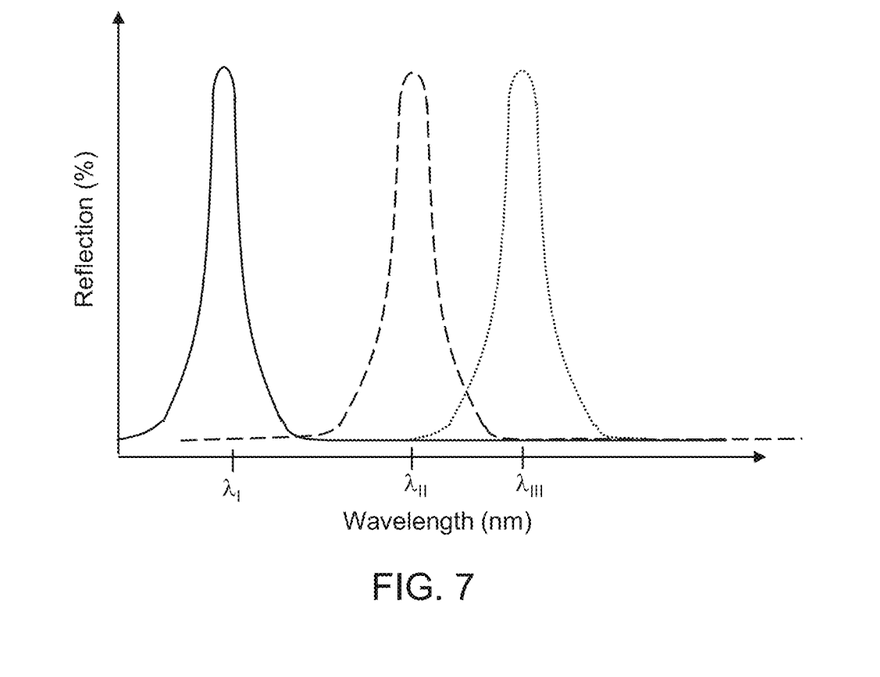
FIG. 7 shows reflected spectral windows for the active reflective filter in FIGS. 6A-6C.

Referring to FIG. 7, a plot of EMR wavelength reflected by the ARF 10 in FIGS. 6A-6C is shown. Particularly, the ARF 10 in FIG. 6A with the first periodic lattice $\Lambda_I$ reflects a narrow band of EMR centered about wavelength $\lambda_I$, the ARF 10 in FIG. 6B with the second periodic lattice $\Lambda_{II}$ reflects a narrow band of EMR centered about wavelength $\lambda_{II}$, and the ARF 10 in FIG. 6C with the third periodic lattice $\Lambda_{III}$ reflects a narrow band of EMR centered about wavelength $\lambda_{III}$. Accordingly, applying a predefined voltage to the EAP layer 100 changes the periodic lattice of the ARF 10 and thereby changes or shifts the range of wavelengths reflected by the ARF 10.

Figure 8B:
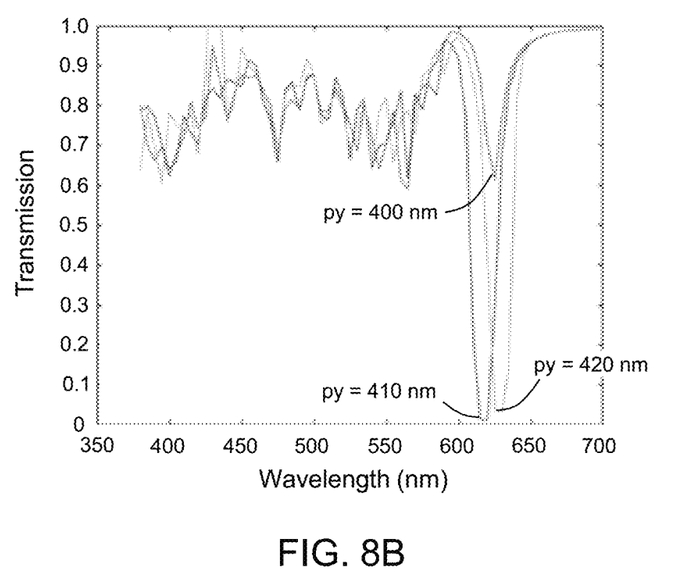
FIG. 8B shows a plot transmission through the active reflective filter in FIG. 8A as a function of wavelength.

Referring now to FIGS. 8A-8B, examples of manipulating the ARF 10 such that a predefined and/or desired EMR wavelength or range of EMR wavelengths are reflected are shown. Particularly, FIG. 8A illustrates wavelength transmission through the ARF 10 as a function of shifting the period (py) of the ARF 10 in the y-direction (i.e., shifting the period of the periodic lattice of the ARF 10) and FIG. 8B illustrates transmission through the ARF 10 as a function of wavelength for three different period (py) values. And as observed from FIGS. 8A-8B, at a period of 400 nm for the ARF 10, EMR with a wavelength of about 625 nm has about 60% transmission (i.e., about 40% reflection) and wavelengths between about 400-600 nm have more than 60% transmission. Also, for a period of 410 nm, EMR with a wavelength of about 618 nm of light has about 0.02 transmission (i.e., about 99.98% reflection), and for a period of 420 nm EMR with a wavelength of about 628 nm has about 0.04 transmission (i.e., about 99.96% reflection) through the ARF 10. Accordingly, stretching the ARF 10 in the y-direction and thereby changing the period of the ARF 10 from 410 nm to 420 nm, provides for a change in reflecting EMR with a wavelength of about 618 nm to a wavelength of about 626 nm.

Figure 9A:
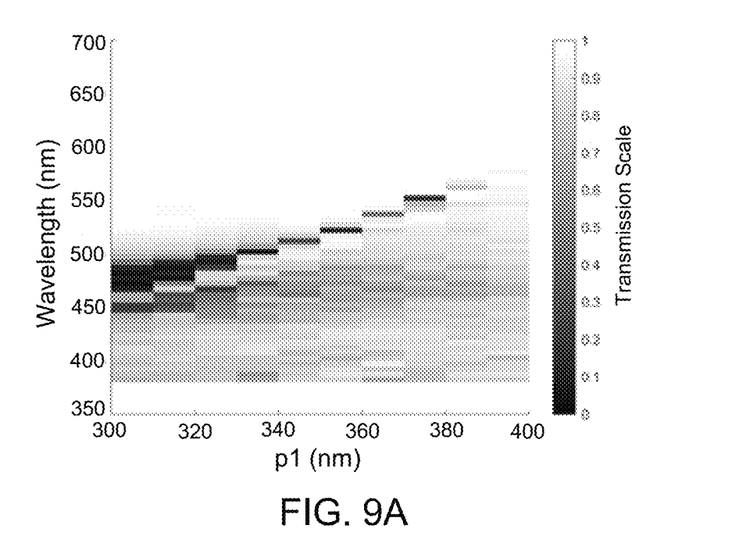
FIG. 9A shows a plot of wavelength transmission through an active reflective filter according to the teachings of the present disclosure as a function of a periodic lattice dimension in the y-direction and the x-direction (P1) of the active reflective filter.
Figure 9B:
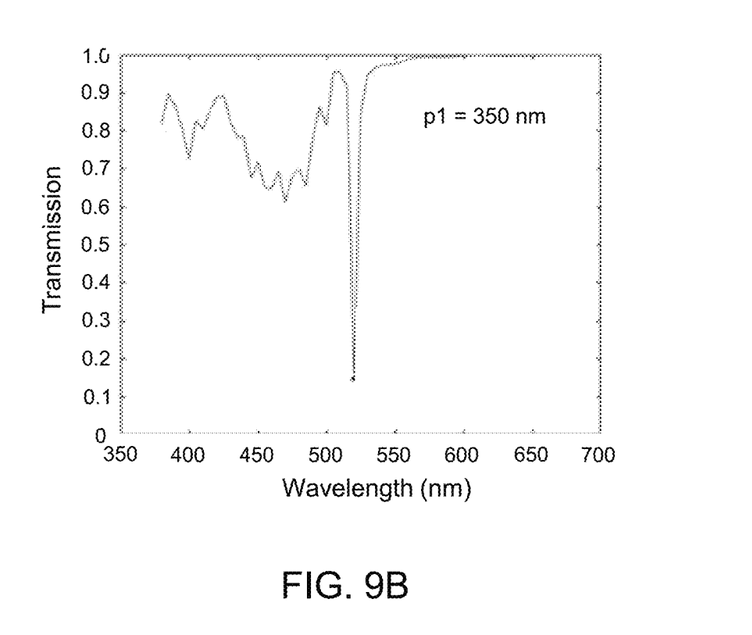
FIG. 9B shows a plot transmission through the active reflective filter in FIG. 9A as a function of wavelength.

Referring now to FIGS. 9A-9B, addition examples of manipulating the ARF 10 such that a predefined and/or desired EMR wavelength or range of EMR wavelengths are reflected are shown. Particularly, FIG. 9A illustrates wavelength transmission through the ARF 10 as a function of stretching the ARF in the y- and x-directions such that the period (p1) of the ARF 10 is changed in the y- and x-directions and FIG. 9B illustrates transmission through the ARF 10 as a function of EMR wavelengths for a single p1 value. And as observed from FIGS. 9A-9B, for a period of 350 nm, reflection of EMR wavelengths has shifted in the infrared direction (compared to FIGS. 8A-8B) with a wavelength of about 520 nm having about 15% transmission (i.e., about 85% reflection). Accordingly, it should be understood that the ARF 10, and other ARFs according to the teachings of the present disclosure, can be manipulated to reflect predefined and/or desired EMR wavelengths or ranges of EMR wavelengths.

Figure 10:
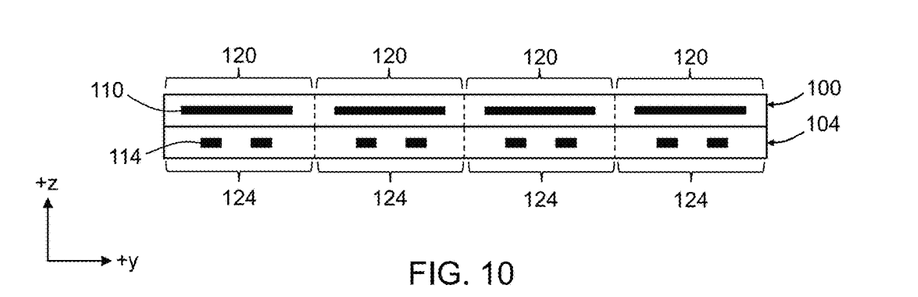
FIG. 10 shows an active reflective filter with a first layer of metamaterial elements stack relative to a second layer of metamaterial elements according to the teachings of the present disclosure.

It should be understood that while FIGS. 1-9B illustrate and discuss ARFs with a single layer of elements that form or provide a periodic lattice (i.e., the elements lie within a single x-y plane shown in the figures), in some variations ARFs according to the teachings of the present disclosure have more than one layer of elements, i.e., the elements can be stacked in the z-direction shown in the figures. For example, and without limitation, FIG. 10 illustrates an ARF 16 with the EAP layer 100, the plurality of elements 110, and the plurality of unit cells 120 stacked above (+z direction) the EAP layer 104, the plurality of elements 114, and the plurality of unit cells 124. In addition, in some variations the plurality or elements 110 disposed within the EAP layer 100 is configured or designed to reflect EMR within a first range of wavelengths (e.g., between about 630-640 nm) and the plurality or elements 114 disposed within the EAP layer 104 is configured or designed to reflect EMR within a second range of wavelengths different than the first range of wavelengths (e.g., between about 430-440 nm). And the plurality or elements 110 disposed within the EAP layer 100 can be configured or designed to be transparent to the second range of wavelengths and the plurality or elements 114 disposed within the EAP layer 104 can be configured or designed to be transparent to the first range of wavelengths. It should also be understood that more that two layers can be stacked in the z-direction such that three or more ranges of EMR wavelengths can be reflected (e.g., red, green, and/or blue EMR wavelengths).

Figure 11A:
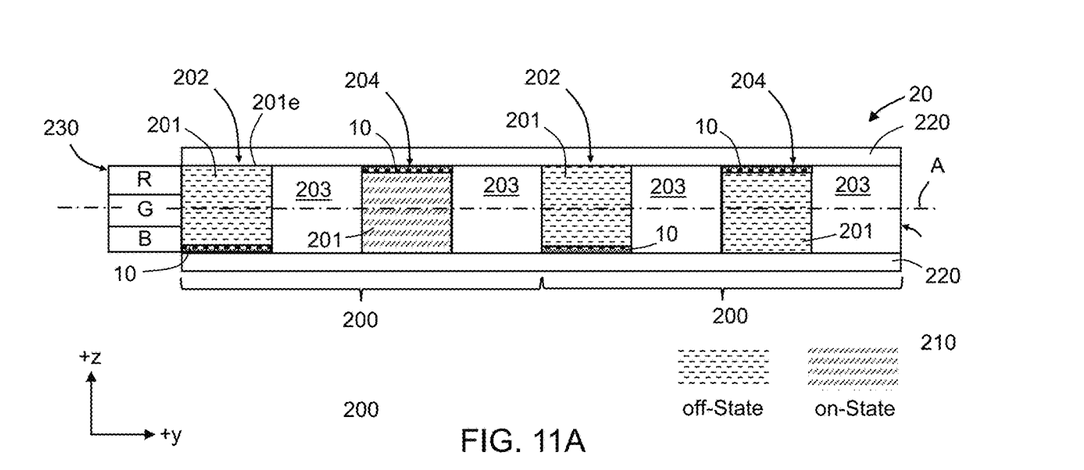
FIG. 11A shows a cross-section of a plurality of subpixels of a transparent display according to the teachings of the present disclosure.
Figure 11B:
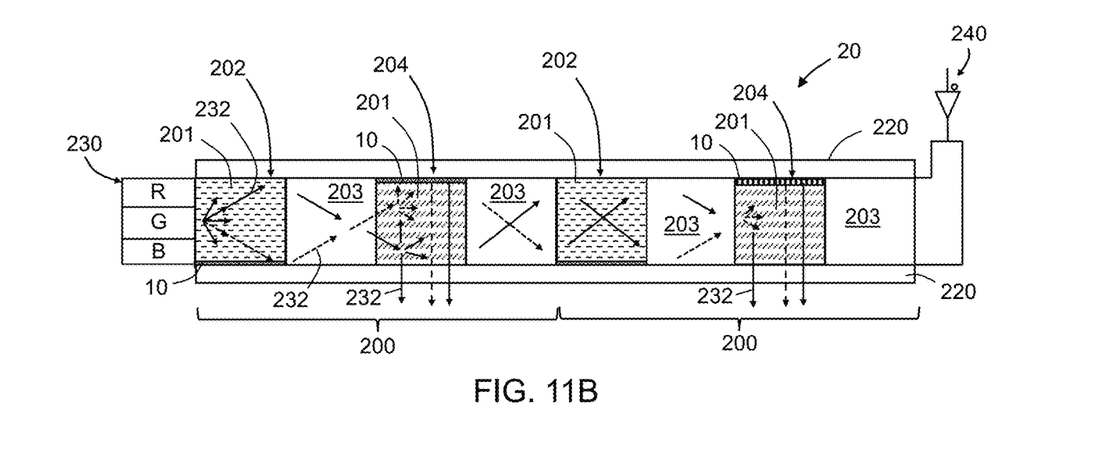
FIG. 11B shows FIG. 11A with two subpixels activated such that light is transmitted through one side of the transparent display.
Figure 11C:
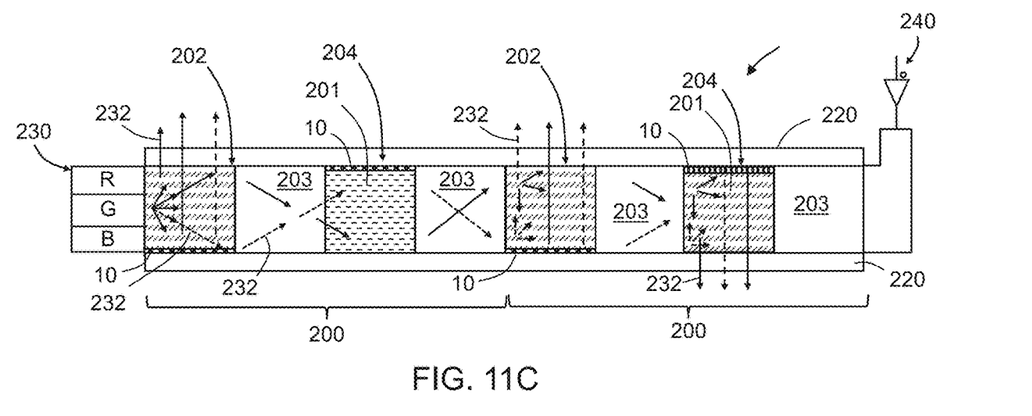
FIG. 11C shows FIG. 11A with three subpixels activated such that light is transmitted through both sides of the transparent display.

Referring to FIGS. 11A-11C one form of a transparent display panel 20 (referred to herein simply as "transparent display 20") with ARFs (ARFs 10 shown for example purposes only) according to the teachings of the present disclosure is shown. The transparent display 20 includes a waveguide 210 with a plurality of pixels 200. The waveguide 210 includes a pair of transparent layers 220 (e.g., glass layers or panels) with the plurality of pixels 200 sandwiched between the pair of transparent layers 220. Also, a light source 230 configured to generate light is attached to the waveguide 210. That is, the transparent display 20 is an edge-lit transparent display. Non-limiting examples of the light source 230 include red, green, and blue (RGB) light sources such as RGB lasers, light emitting diodes (LEDs), micro-LEDs, and quantum dots, among others.

Each of the transparent layers 220 has an inner surface (the surface closest to the axis of symmetry 'A') and an outer surface (the surface farthest from the axis of symmetry A), and each of the pixels 200 includes a subpixel 202 and a subpixel 204. In some variations, a first subset of the subpixels, e.g., subpixels 202 face a first direction normal to the pair of transparent layers 220 and a second subset of the subpixels, e.g., subpixels 204, face a second direction opposite and parallel to the first direction. As used herein, the term "face" or "facing" refers to a direction that light reflected by an activated ARF 10 of a subpixel 202 or subpixel 204 propagates through one of the transparent layers 220. For example, the subpixels 202 in FIGS. 11A-11C, when activated, scatter light in the +z direction and thus are facing the +z direction.

The subpixels 202, 204 include an ARF 10 and a liquid crystal unit 201. It should be understood that the liquid crystal unit 201 can be formed from a liquid crystal material mixed with a monomer which is polymerized, and polymerization and orientation of the liquid crystal material+ monomer induces scattering sufficient for the display. As noted above, in some variations the subpixels 202 are configured to transmit light in the +z direction and the subpixels 204 are configured to scatter light in the −z direction. In such variations the ARFs 10 for the subpixels 202 are positioned adjacent to the lower (−z direction) transparent layer 220 and the liquid crystal units 201 for the subpixels 202 are positioned between the ARF 10 and the upper (+z direction) transparent layer 220. Accordingly, light reflected by the ARFs 10 in the subpixels 202 propagates in the +z direction. Also, the ARFs 10 for the subpixels 204 are positioned adjacent to the upper transparent layer 220 and the liquid crystal units 201 for the subpixels 204 are positioned between the ARF 10 and the lower transparent layer 220. Accordingly, light reflected by the ARFs 10 in the subpixels 204 is transmitted in the −z direction. In at least one variation, a transparent subpixel 203 is disposed between subpixels 202 and subpixels 204 such that transparency of the transparent display 20 is enhanced. That is, transparency of the transparent display 20 is enhanced with the addition or presence of transparent subpixels 203. In addition, the ARFs 10 are in electrical communication with one or more electrical power sources (not shown) and are configured to change their periodic lattice as discussed above.

Each of the liquid crystal units 201 has two different refractive indices, $n_e$ (extraordinary) and $n_o$ (ordinary), depending on an electro-optical state of the liquid crystal material in a given liquid crystal unit 201, and a transparent electrode 201e configured to apply a voltage to the liquid crystal material. For example, and as illustrated in the legend of FIG. 11A, molecules of the liquid crystal material in an "off-state" allow light to transmit in the y-direction shown in the figures since there is no disruption to the flow or propagation of light, whereas in the "on-state" the polymerized molecules are disrupted when the liquid crystal alignment changes, thereby inducing scattering. Accordingly, and in response to electrical control (e.g., a voltage) from a driver circuit 240 (FIG. 11B), the molecules of the liquid crystal units 201 are caused to orient themselves in the off-state or the on-state.

Referring particularly to FIG. 11B, the transparent display 20 includes the driver circuit 240 configured to provide an electrical control independently to each of the ARFs 10 and each of the liquid crystal units 201. In some variations the electrical control for a given ARF 10 is the same electrical control for the corresponding liquid crystal unit 201 of a given subpixel 202, 204. In other variations, the electrical control for a given ARF 10 is a different electrical control that for the corresponding liquid crystal unit 201 of a given subpixel 202, 204. In either variation, and as illustrated in FIG. 11B, the driver circuit 240 provides an electrical control to subpixels 204 such a predefined light 232 (i.e., a predefined range of EMR wavelengths such as "green light") propagating from the light source 230 is reflected by the ARFs 10 in the subpixels 204 (i.e., the ARFs 10 are activated) and the liquid crystal units 201 are activated into the on-state. Accordingly, light reflected by the ARFs 10 propagates in the −z-direction and through the lower transparent layer 220 such that the pixels 200 exhibit a desired color (e.g., green) to an individual viewing the transparent display 20 in the +z direction. In addition, and given that the ARFs 10 and the liquid crystal units 201 are transparent, the remainder of the transparent display 20 (i.e., the subpixels 202, 204 not activated and transparent subpixels 203) remain transparent to the individual viewing the transparent display in the +z direction, and optionally remains transparent to another individual viewing the transparent display 20 in the −z direction.

Referring particularly to FIG. 11C, the driver circuit 240 provides an electrical control to subpixels 202 such that predefined light 232 (e.g., green light) propagating from the light source 230 is reflected by the ARFs 10 in the +z-direction and the liquid crystal units 201 are in the on-state. In addition, the driver circuit 240 provides an electrical control to one of the subpixels 204 such that the light 232 propagating from the light source 230 is reflected by the ARF 10 in the −z-direction and the liquid crystal unit 201 is in the on-state. Accordingly, light reflected by the ARFs 10 propagates in the +z-direction and through the upper transparent layer 220 at the subpixels 202 and propagates in the −z-direction and through the lower transparent layer 220 at the subpixel 204 as shown in the figures. In addition, and given that the ARFs 10 and the liquid crystal units 201 are transparent, the remainder of the transparent display 20 remains transparent to the individual viewing the transparent display 20 in the +z direction, and optionally remains transparent to another individual viewing the transparent display 20 in the −z direction.

Figure 12A:
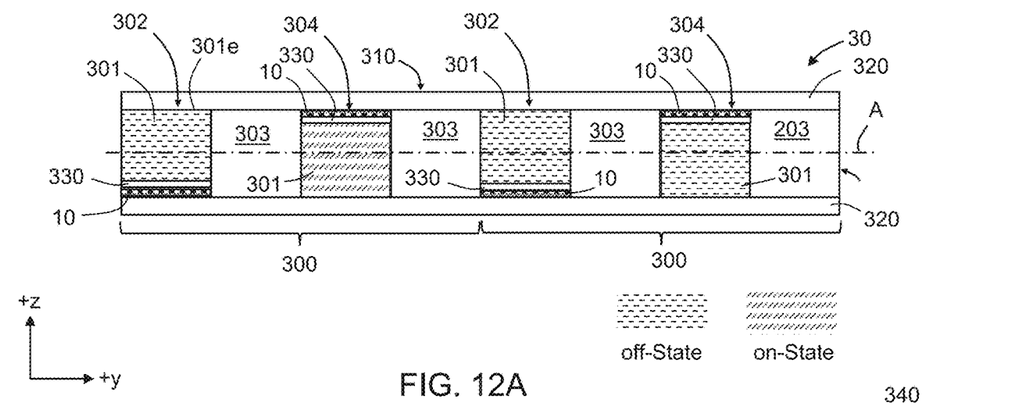
FIG. 12A shows a cross-section of a plurality of subpixels of another transparent display according to the teachings of the present disclosure.
Figure 12B:
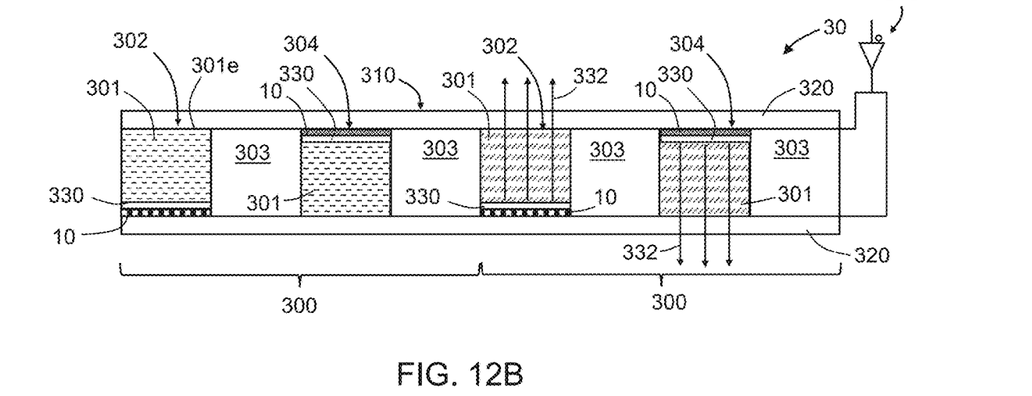
FIG. 12B shows FIG. 12A with three subpixels activated such that light is transmitted through both sides of the transparent display.

Referring to FIGS. 12A-12B, another form of a transparent display panel 30 (referred to herein simply as "transparent display 30") with ARFs (ARFs 10 shown for example purposes only) according to the teachings of the present disclosure is shown. The transparent display 30 includes a plurality of pixels 300 disposed within a waveguide 310 that includes a pair of transparent layers 320 (e.g., glass layers or panels). Also, a plurality of light sources 330 are included within the waveguide 310. That is, the transparent display 20 is a direct-lit transparent display. Non-limiting examples of the light sources 330 include organic LEDs (OLEDs) and quantum dots, among others.

Each of the transparent layers 320 has an inner surface (the surface closest to the axis of symmetry 'A') and an outer surface (the surface farthest from the axis of symmetry A), and each of the pixels 300 includes a subpixel 302 and a subpixel 304. The subpixels 302, 304 include an ARF 10, a light source 330 (e.g., an OLED) and a liquid crystal unit 301 with a transparent electrode 310e. In some variations the subpixels 302 are configured to transmit light in the +z direction and the subpixels 304 are configured to transmit light in the −z direction. Particularly, the ARFs 10 for the subpixels 302 are positioned adjacent to the lower (−z direction) transparent layer 320 and the liquid crystal units 301 for the subpixels 302 are positioned between the ARF 10 and the upper (+z direction) transparent layer 320. Accordingly, light reflected by the ARFs 10 in the subpixels 302 propagates in the +z direction. Also, the ARFs 10 for the subpixels 304 are positioned adjacent to the upper transparent layer 320 and the liquid crystal units 301 for the subpixels 304 are positioned between the ARF 10 and the lower transparent layer 320. Accordingly, light reflected by the ARFs 10 in the subpixels 304 propagates in the −z direction. In at least one variation, a transparent subpixel 303 is disposed between the subpixel 302 and the subpixel 304 such that transparency of the transparent display 30 is enhanced. In addition, the ARFs 10 are in electrical communication with one or more electrical power sources (not shown) and are configured to change their periodic lattice as discussed above.

Referring particularly to FIG. 12B, the transparent display 30 includes a driver circuit 340 configured to provide an electrical control independently to each of the ARFs 10, liquid crystal units 201, and light sources 330. And as shown in the figure, the driver circuit 340 is providing an electrical control to two of the subpixels 302 such that light 332 propagating from the light sources 330 of the two subpixels 302 is reflected by the ARFs 10 in the two subpixels 302 and the corresponding liquid crystal units 301 are in the on-state. According, light reflected by these two ARFs 10 propagates in the +z-direction and through the upper transparent layer 320 such that the pixels 300. In addition, the driver circuit 340 is providing an electrical control to one of the subpixels 304 such that light 332 propagating from the light source 330 of the subpixel 304 is reflected by the ARF 10 (in the subpixel 304) and the corresponding liquid crystal unit 301 is in the on-state. According, light reflected by the ARF 10 propagates in the −z-direction and through the lower transparent layer 320 such that the pixel 300 exhibits a desired color to a user viewing the transparent display 30 in the −z direction.

It should be understood that while FIGS. 11A-12B illustrate and discuss dual-sided transparent displays, the ARFs according to the teachings of the present disclosures can be used or employed in other types of displays such as single-sided transparent displays, non-transparent displays (e.g., traditional OLED displays), augmented reality glasses or displays, among others.

Figure 13A:
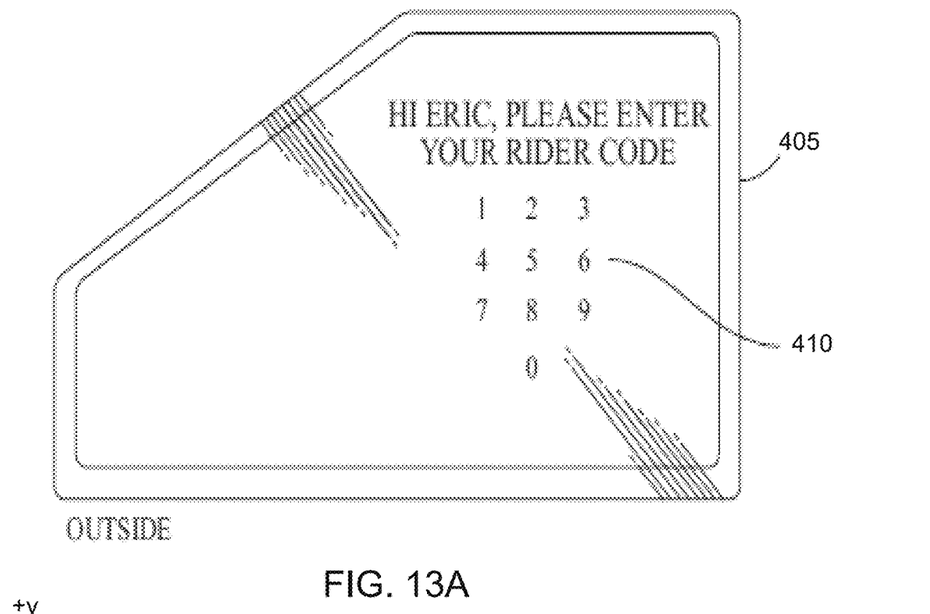
FIG. 13A shows an outside view of a vehicle window with a dual-sided transparent display according to the teachings of the present disclosure.
Figure 13B:
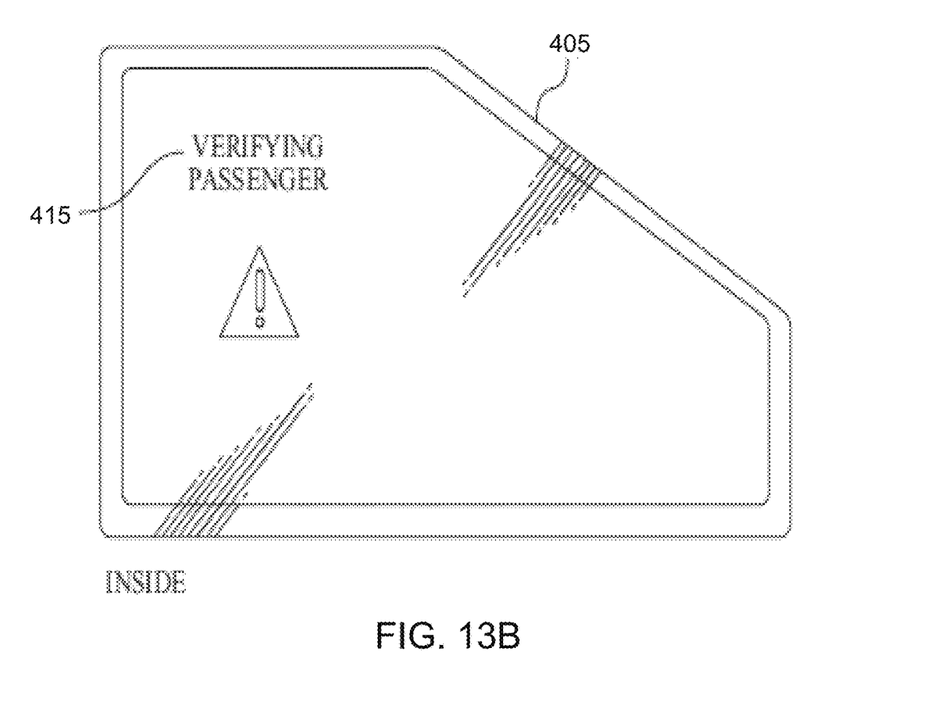
FIG. 13B shows an inside view of the vehicle window in FIG. 13A according to the teachings of the present disclosure.

Referring now to FIGS. 13A-13B, an exterior side of a vehicle smart window 405 that includes a dual-sided transparent display panel according to the teachings of the present disclosure. Particularly, FIG. 13A illustrates the vehicle smart window 405 prompting a user (e.g., a car-sharing customer), via a displayed outside image 410, to enter a rider code to gain entry to the vehicle (not shown). And at the same time the vehicle smart window 405 displays a completely different image 415 to one or more occupants inside the vehicle as illustrated in FIG. 13B. It should be understood that the vehicle smart window 405, as depicted in FIGS. 13A and 13B, is merely one example of a variety of applications for a dual-sided transparent display panel. Other applications include, without limitation, a smart store window (e.g., to display advertising outside the store, direct customers inside the store to products of interest, etc.), informational kiosks at airports and bus stations, education, and gaming/entertainment.

In some variations the ARFs disclosed herein reflect light typically scattered in unnecessary or unintended directions such that the light efficiency of a transparent display is enhanced. For example, traditional transparent displays typically have an inverted image (of a desired image for viewing) on a backside of the display (i.e., a side or surface of a display not intended for viewing of the desired image) and such inverted images are not desired or useful, especially when the desired image is a word or words for a user to read on a front side of the display (i.e., the side or surface of the display intended for viewing of the desired image). However, the ARFs disclosed herein reflect light to the front side of the transparent display and thus reduce or prevent light leakage to the backside of the display. In addition, and as described above, in some variations the ARFs disclosed herein reflect EMR (e.g., light) light corresponding to the range of light wavelengths being transmitted by a light source (e.g., an RGB light source) and EMR wavelengths outside of the reflected range transmit or propagate through the ARFs. Accordingly, the transparent display is transparent to light (color) not being reflected by the ARFs at a given time.

In at least one variation, the AFRs are activated with at least the same amount or magnitude of voltage that is applied to the corresponding liquid crystal unit, and in some variations the ARFs are activated with the same voltage source (electrical control) applied to the corresponding liquid crystal unit. Accordingly, the ARFs utilize the voltage source applied to traditional emissive displays such as a quantum dot displays and OLED displays, among others. Also, it should be understood that the ARFs disclosed herein can and are per-pixel active filters that replace RGB filters.

The preceding description is merely illustrative in nature and is in no way intended to limit the disclosure, its application, or uses. Work of the presently named inventors, to the extent it may be described in the background section, as well as aspects of the description that may not otherwise qualify as prior art at the time of filing, are neither expressly nor impliedly admitted as prior art against the present technology.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple variations or forms having stated features is not intended to exclude other variations or forms having additional features, or other variations or forms incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one variation, or various variations means that a particular feature, structure, or characteristic described in connection with a form or variation, or particular system is included in at least one variation or form. The appearances of the phrase "in one variation" (or variations thereof) are not necessarily referring to the same variation or form. It should be also understood that the various method steps discussed herein do not have to be carried out in the same order as depicted, and not each method step is required in each variation or form.

The foregoing description of the forms and variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

What is claimed is:

1. A transparent display with a waveguide comprising:
a pair of transparent layers;
a plurality of subpixels sandwiched between the pair of transparent layers, the plurality of subpixels individually comprising:
an electroactive polymer (EAP) layer and a plurality of metamaterial elements disposed in the EAP layer and forming a periodic lattice with a spectral window, the EAP layer configured to change shape such that the periodic lattice and the spectral window change when a voltage is applied across the EAP layer;
a liquid crystal unit disposed on the EAP layer, the liquid crystal unit including a liquid crystal matrix and a transparent electrode; and
a transparent subpixel disposed between adjacent pairs of the plurality of subpixels; and
a driver circuit configured to activate the plurality of subpixels with a voltage, wherein the plurality of subpixels are transparent between the pair of transparent layers when not activated such that portions of the transparent display with subpixels that are not activated are transparent to an individual viewing the transparent display.

2. The transparent display with the waveguide according to claim 1 further comprising:
a light source attached to the pair of transparent layers and configured to generate light that propagates between the pair of transparent layers; and
a driver circuit configured to activate the plurality of subpixels with an electrical control.

3. The transparent display with the waveguide according to claim 2, wherein a first subset of the plurality of subpixels face a first direction normal to the pair of transparent layers and a second subset of the plurality of subpixels face a second direction opposite and parallel to the first direction.

4. The transparent display with the waveguide according to claim 3, wherein the plurality of subpixels is configured to reflect and a corresponding liquid crystal unit are configured to, when activated, reflect and transmit, respectively, a predefined range of electromagnetic radiation (EMR) wavelengths such the predefined range of EMR wavelengths propagate through one of the pair of transparent layers.

5. The transparent display with the waveguide according to claim 1, wherein a distance between adjacent metamaterial elements of the plurality of metamaterial elements is configured to change such that the periodic lattice and the spectral window change when the voltage is applied across the EAP layer.

6. The transparent display with the waveguide according to claim 2, wherein the plurality of subpixels are configured to apply the electrical control to the transparent electrode of the liquid crystal unit and the EAP layer such that the liquid crystal matrix and the EAP layer are activated and the periodic lattice and the spectral window change.

7. The transparent display with the waveguide according to claim 3, wherein the driver circuit is configure to provide electrical control to and activate one or more of the first subset of the plurality of subpixels such that light propagating from the light source is reflected by one or more of the first subset of the plurality of subpixels in the first direction, provide electrical control to and activate one or more of the second subset of the plurality of subpixels such that light propagating from the light source is reflected by one or more of the second subset of the plurality of subpixels in the second direction and wherein a remainder of the transparent display with subpixels not activated by the driver circuit are transparent to an individual viewing the transparent display.

8. A transparent display with a waveguide comprising:
a pair of transparent layers;
a plurality of subpixels sandwiched between the pair of transparent layers with a first subset of the plurality of subpixels face a first direction normal to the pair of transparent layers and a second subset of the plurality of subpixels face a second direction opposite and parallel to the first direction, wherein the plurality of subpixels individually comprise:
an electroactive polymer (EAP) layer and a plurality of metamaterial elements disposed in the EAP layer and forming a periodic lattice with a spectral window, the EAP layer configured to change shape such that the periodic lattice and the spectral window change when a voltage is applied across the EAP layer;
a liquid crystal unit disposed on the EAP layer, the liquid crystal unit including a liquid crystal matrix and a transparent electrode; and
a driver circuit configured to activate the plurality of subpixels with a voltage, wherein the plurality of subpixels are transparent between the pair of transparent layers when not activated such that portions of the transparent display with subpixels that are not activated are transparent to an individual viewing the transparent display.

9. The transparent display with the waveguide according to claim 8, wherein the plurality of subpixels is configured to reflect and a corresponding liquid crystal unit are configured to, when activated, reflect and transmit, respectively, a predefined range of electromagnetic radiation (EMR) wavelengths such the predefined range of EMR wavelengths propagate through one of the pair of transparent layers.

10. The transparent display with the waveguide according to claim 8 further comprising:
a light source attached to the pair of transparent layers and configured to generate light that propagates between the pair of transparent layers; and
a driver circuit configured to activate the plurality of subpixels with an electrical control.

11. The transparent display with the waveguide according to claim 8, wherein a distance between adjacent metamaterial elements of the plurality of metamaterial elements is configured to change such that the periodic lattice and the spectral window change when the voltage is applied across the EAP layer.

12. The transparent display with the waveguide according to claim 8, wherein the plurality of subpixels are configured to apply an electrical control to the transparent electrode of the liquid crystal unit and the EAP layer such that the liquid crystal matrix and the EAP layer are activated and the periodic lattice and the spectral window change.

13. The transparent display with the waveguide according to claim 8, wherein a plurality of transparent subpixels disposed between adjacent pairs of the plurality of subpixels.

14. The transparent display with the waveguide according to claim 8, wherein a first subset of the plurality of subpixels face a first direction normal to the pair of transparent layers and a second subset of the plurality of subpixels face a second direction opposite and parallel to the first direction.

15. The transparent display with the waveguide according to claim 14 further comprising:
a light source attached to the pair of transparent layers and configured to generate light that propagates between the pair of transparent layers; and a driver circuit configured to:
- provide electrical control to and activate one or more of the first subset of the plurality of subpixels such that light propagating from the light source is reflected by one or more of the first subset of the plurality of subpixels in the first direction;
- provide electrical control to and activate one or more of the second subset of the plurality of subpixels such that light propagating from the light source is reflected by one or more of the second subset of the plurality of subpixels in the second direction; and
- wherein a remainder of the transparent display with subpixels not activated by the driver circuit are transparent to an individual viewing the transparent display.

* * * * *